(No Model.) 5 Sheets—Sheet 2.
R. KIESERLING.
APPARATUS FOR MAKING HOLLOW ARTICLES FROM PLASTIC MATERIAL.
No. 505,362. Patented Sept. 19, 1893.
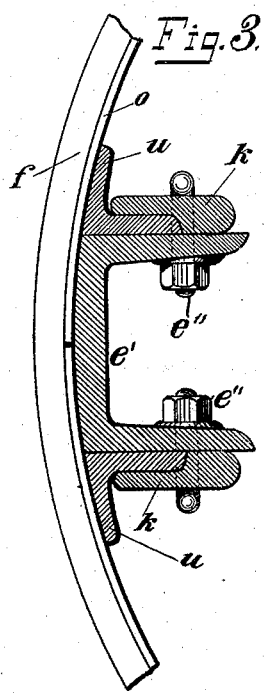
Fig. 3.
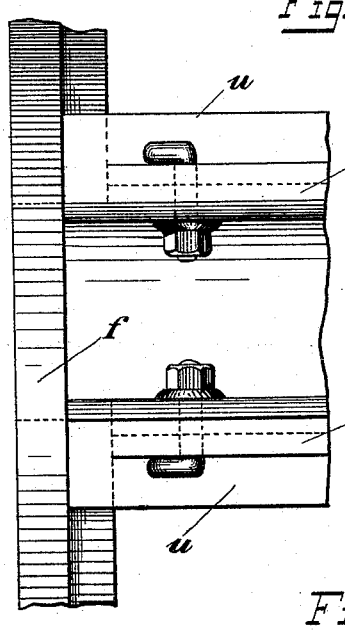
Fig. 3ª
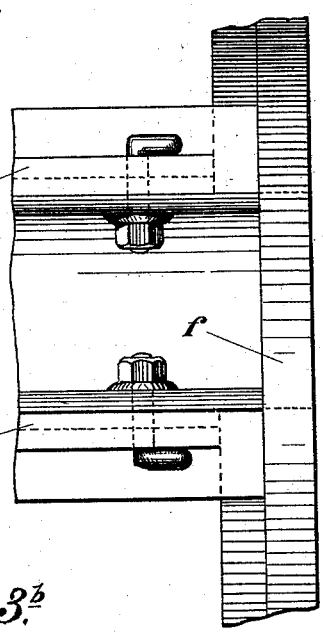
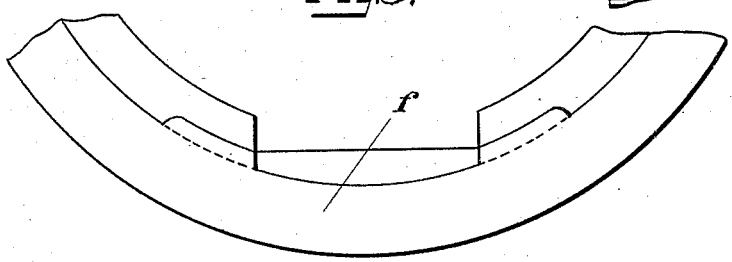
Fig. 3ᵇ
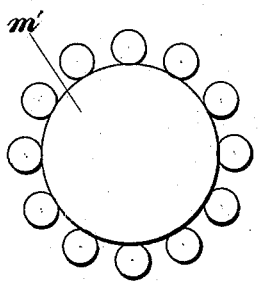
Fig. 5.
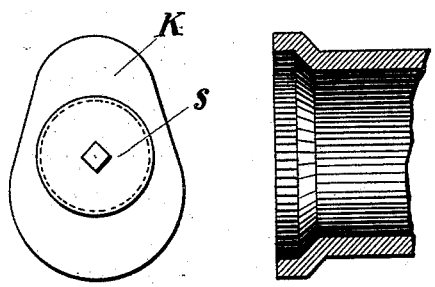
Fig. 6.
Witnesses:
J. A. Rutherford
Robert Everett
Inventor:
Robert Kieserling
By James L. Norris.
Attorney.

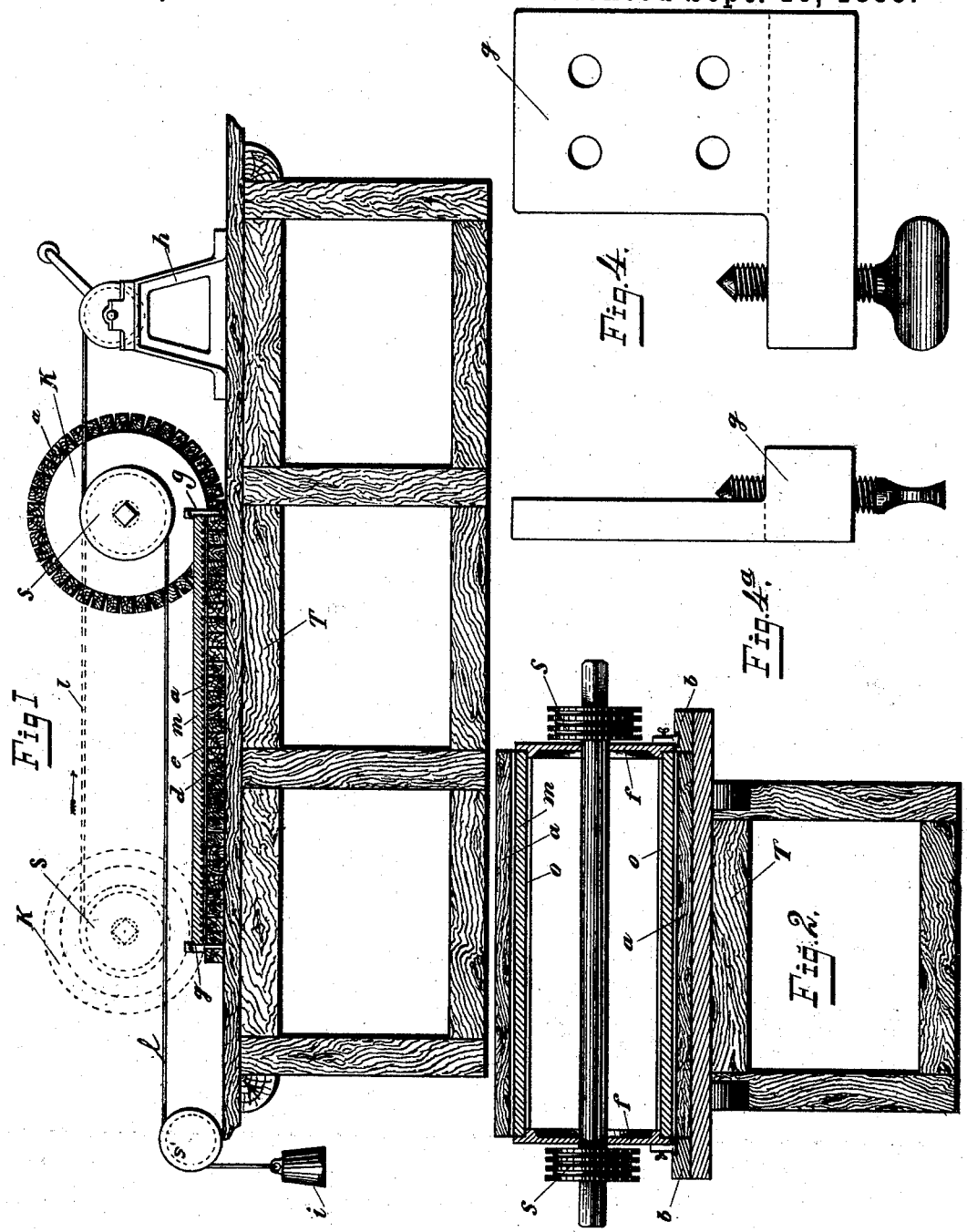

(No Model.) 5 Sheets—Sheet 5.

R. KIESERLING.
APPARATUS FOR MAKING HOLLOW ARTICLES FROM PLASTIC MATERIAL.

No. 505,362. Patented Sept. 19, 1893.

UNITED STATES PATENT OFFICE.

ROBERT KIESERLING, OF HAMBURG, GERMANY.

APPARATUS FOR MAKING HOLLOW ARTICLES FROM PLASTIC MATERIAL.

SPECIFICATION forming part of Letters Patent No. 505,362, dated September 19, 1893.

Application filed October 22, 1891. Serial No. 409,516. (No model.)

*To all whom it may concern:*

Be it known that I, ROBERT KIESERLING, of the free state of Hamburg, German Empire, have invented new and useful Improvements in Apparatus for Making Hollow Articles from Plastic Material, of which the following is a specification, reference being had therein to the accompanying drawings.

My invention relates to apparatus for the production of hollow-ware from plastic material, and it consists in the novel construction, combination, and arrangement of parts hereinafter described and claimed, reference being made to the accompanying drawings, in which—

Figure 7:
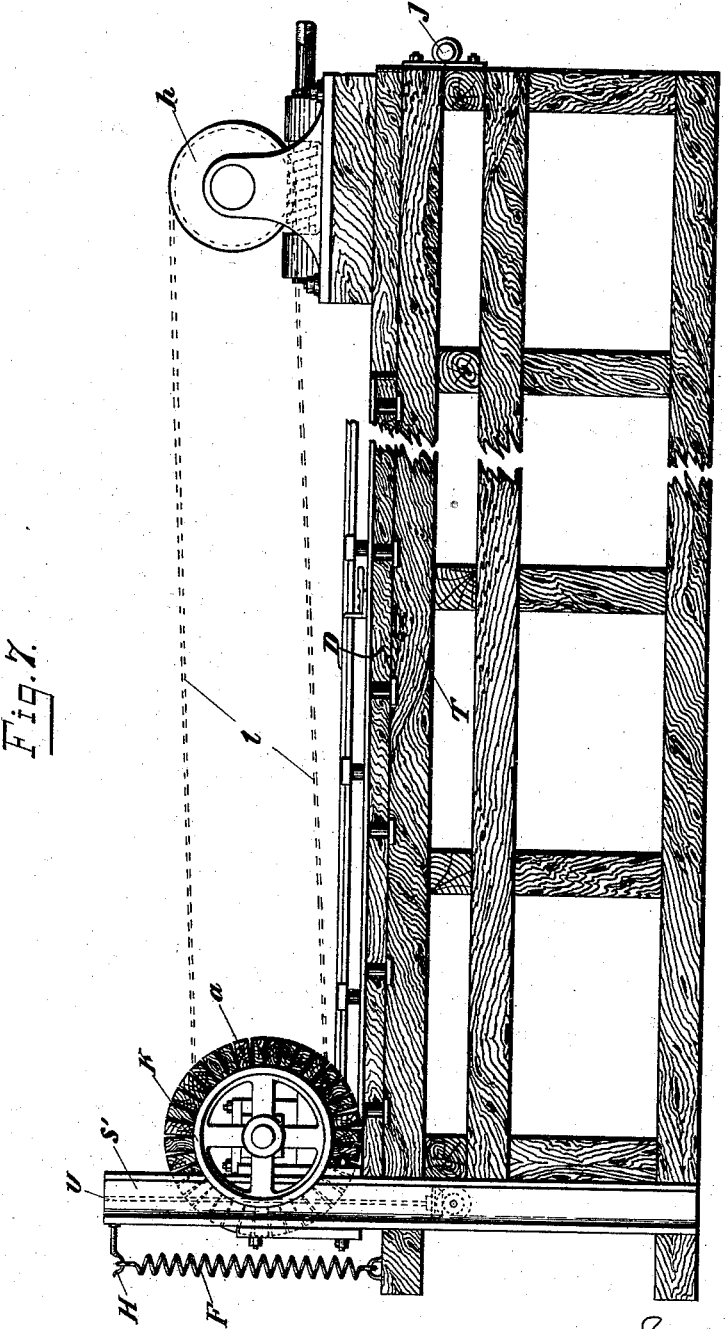
Figure 8:
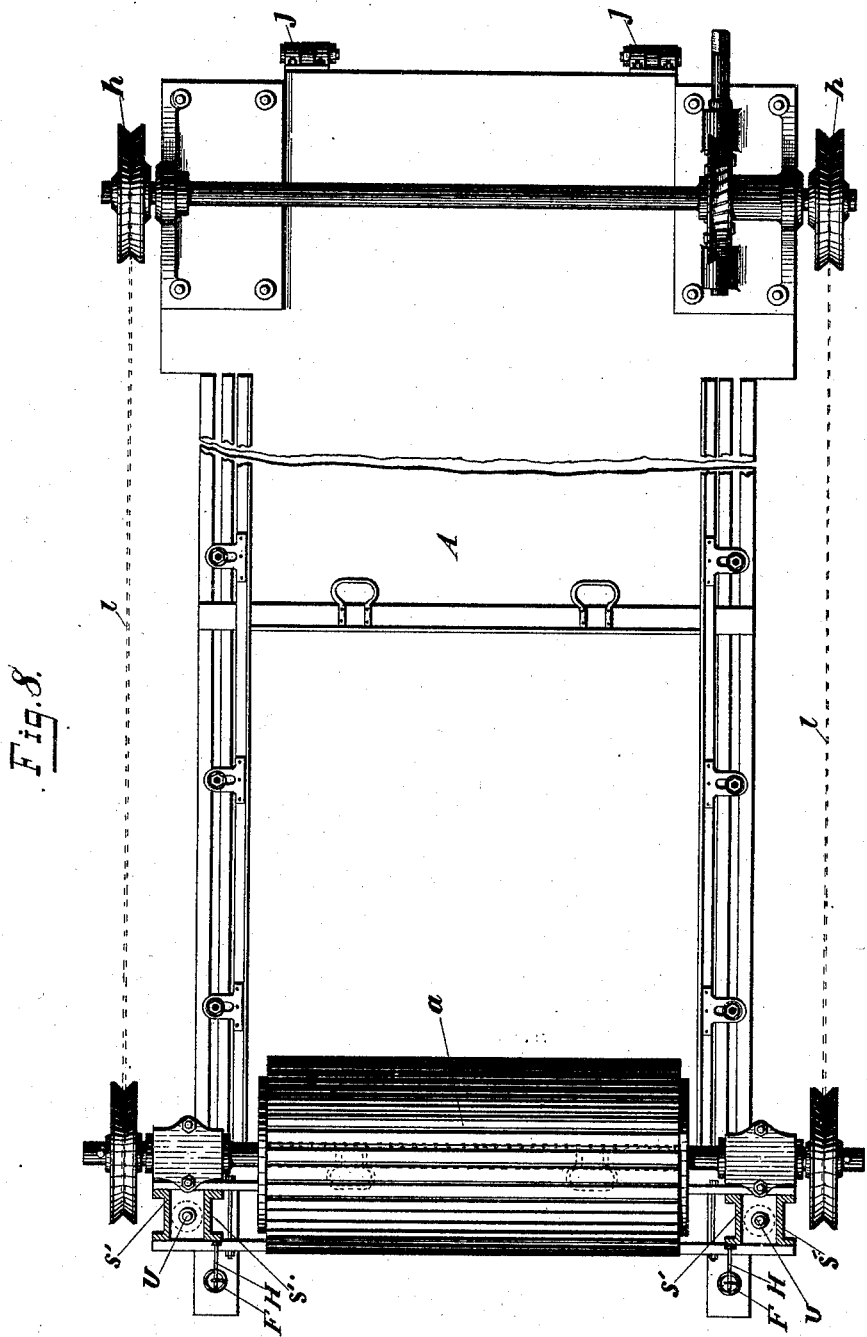
Figure 9:
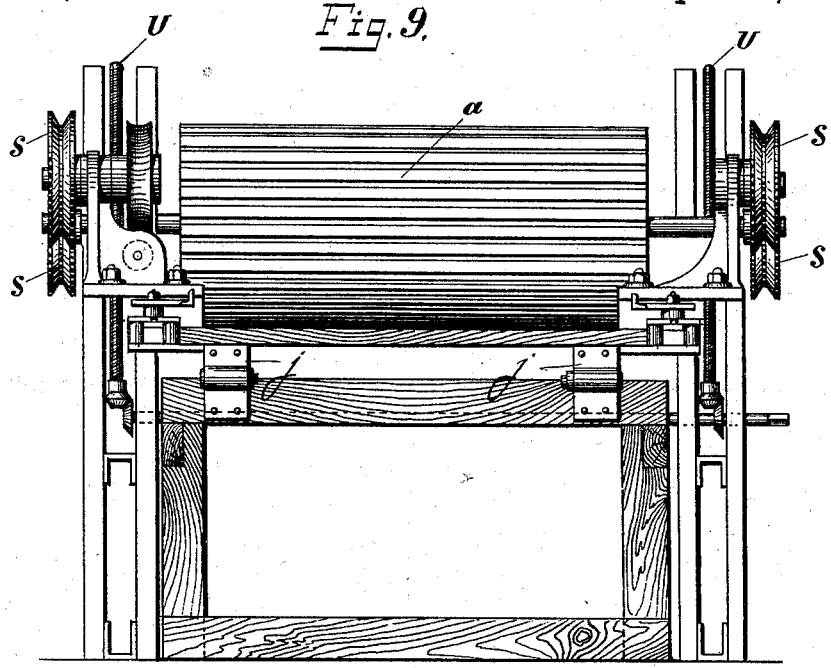
Figure 10:
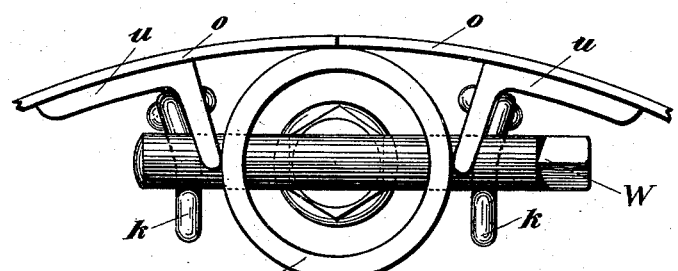
Figure 11:
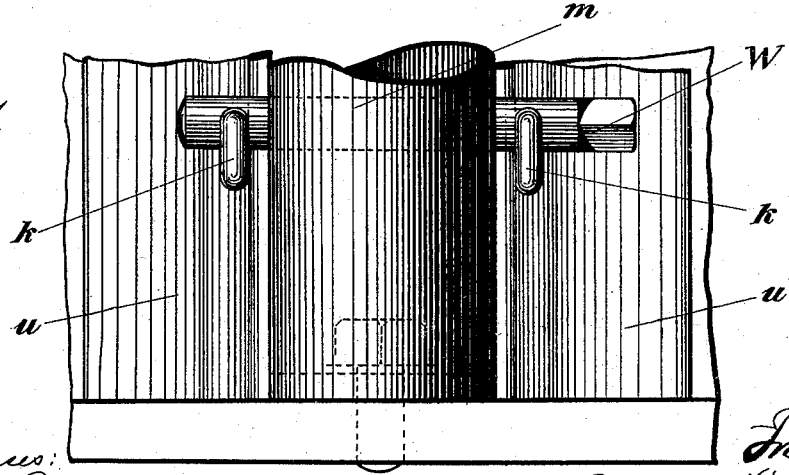

Figure 1 is a longitudinal section of a roller apparatus for small hollow-ware. Fig. 2, is a cross section through Fig. 1. Fig. 3, is a cross section through a part of the securing device for the forming-core, and Fig. $3^a$ represents a broken front view of the same. Fig. $3^b$ is a part end view of Fig. $3^a$. Figs. 4 and $4^a$, are detail views of a conveyer or carrier bar. Fig. 5, is a modified form of forming-core. Fig. 6 is a face view and a section of a modified form of core. Fig. 7 is a longitudinal section of a machine for larger hollow articles. Fig. 8 is a plan view of the same. Fig. 9 is an end view of part of Fig. 7. Figs. 10 and 11 are detail views on an enlarged scale of securing devices for the core.

In the drawings the reference letter T, designates a table top which is supported on a suitable strong frame. This table top serves as a foundation for the apparatus hereinafter described.

The letter $a$ designates a jointed or flexible plate consisting of a number of staves or slats united by flexible bands, and on this jointed or flexible plate $a$ is supported a plate of flexible material $d$. Both these plates $a$ and $d$ are movable longitudinally and are guided in their movement by guide-pieces $b$ (Fig. 2). A perforated metal plate, wire cloth or equivalent material $e$, is placed on the upper surface of the plate $d$. Above the perforated plate $e$ is a roller comprising a hollow core K having a cylindrical, oval, three cornered, square or irregular cross-section, according to the interior shape to be given the article to be manufactured. On each end this core is provided with heads $f$, (Figs. 3, $3^a$ and $3^b$) which extend outwardly from the core a distance equal to twice the thickness of the article to be produced. The shape of the head plates corresponds to the shape of the article to be produced. The core itself consists of a circularly bent piece of sheet metal $o$ (Fig. 3) or its equivalent loosely coupled together by a locking device constructed as shown in Fig. 3, or as modified in Fig. 10.

As shown in Fig. 3, the plate $o$ is provided near its meeting edges with two angle-irons $u$, and inserted between these angle-irons $u$ is a U-shaped iron $e'$.

Passing through holes provided therefor in the U-shaped iron $e'$ are hooked screw bolts $e''$, the hooked ends of which engage and confine the latches $k$ which engage the angle irons $u$ and thus lock the meeting ends of the core plate $o$ together.

In the arrangement shown in Fig. 10 the two angle-irons $u$ are secured to the meeting edges of the plate $o$ and a tube $m$ provided with grooves is inserted between the angle irons the ends of the angle-irons engaging the grooves therein.

Passing through the tube $m$ is a bar W which is engaged by hooks pivoted to the angle irons in such manner as to lock the meeting ends of the core plate.

By loosening the locking device the core can be contracted and the article which has been molded thereon withdrawn without danger of injuring it. The core is placed on the same shaft with a sheave $s$ which is operated by a winding apparatus $h$ and a counterweight $i$, attached to a cord $l$ passing over another sheave $s'$.

The slatted-plate $a$ is secured to the head plate of the core by means of the carrier or bar $g$, (Figs. 1, 4, 10, and 11,) whereby upon revolving the core by the means described, the slatted-plate $a$ and with it the flexible plate $d$, the wire cloth or perforated metal plate $e$ and the plastic material $m'$ is wound around the core, the slatted-plate resting on the extended head-plates $f$, without actually touching the core.

For the manufacture of articles of larger cross-section I provide an apparatus as shown in Figs. 7 to 9 of the drawings, differing from that already described in that the table top is made yielding. The table top T has a hinge connection J with the frame work at one end and at the other end is connected to the upright standards S', by a spiral spring F, one end of which is secured to the table top and the other end of which engages a hook on the said standards S'. The height of the standards may be adjusted by means of a screw U. The material manipulated by rolling, kneading, mangling, or in equivalent manner, will be placed in a continuous flat layer upon the slatted plate $a$, the above-mentioned plate $e$ preventing the sticking of the material to the slatted plate. The winding-apparatus is then slowly revolved, after the slatted plate has been connected to the head-plates $f$ of said plate by means of a suitable number of carriers $g$. By the revolving of the head-plate as well as the core, the slatted plate will gradually be wound around the head plates, which operation will be suspended as soon as the two ends of the material, also wound by this operation, abut against each other. The crevice created must be closed by the same kind of material or some similar connecting material. The shape which has been obtained, will correspond exactly in cross section to the core and head-plates, as on account of the close contact of the slatted plate on the head-plate the entire space between the connecting-line of the edges of the head-plates and the covering-surface of the core is entirely filled with compressed material. The above-mentioned connecting-line with the edges of the head-plate is produced by the slatted plate. According as this line is a straight or broken one, the core will show by its longitudinal lines either smooth or curved surfaces, and in this manner, for instance, it will be easy to apply strengthening ribs, and depressions or hoops can also be produced. When the arrangement just described, has assumed this condition, the oppositely arranged carrier-bars are drawn together, and thereby the unity of the material with the core can be still more augmented. The slatted plate and the flexible plate are then removed, and the core with the plastic material adhering thereto is exposed, according to the nature of the plastic material, to the air or to fire. After a sufficient exposure the coupling of the core is released; the core is collapsed or folded up and can then be drawn out of the finished article. The completed article will show on its inner surface a perfectly smooth and polished upper surface, and it can then be smoothed correspondingly. The object of the yielding table-top is simply, that in producing articles, which are not cylindrical, or are of more or less irregular cross-section, the contact of the slatted plate with the head plates, during the operation of the machine is insured.

What I claim is—

1. An apparatus for manufacturing hollow articles of plastic material, consisting of a core, a shaft in the core, a table, a slatted plate secured to the core and adapted to rest on the table, a sheet of foraminous material extending over the slatted plate and on which the plastic substance is placed, and mechanism connected with the shaft of the core for winding the slatted plate, the foraminous material, and the plastic substance upon the core, substantially as described.

2. An apparatus for the manufacture of articles of plastic material, consisting of a core, a slatted plate secured thereto, a sheet of foraminous material extending over the slatted plate and on which the plastic substance is placed, and means for winding the slatted plate, the foraminous material, and the plastic substance upon the core, substantially as described.

3. In an apparatus for the manufacture of hollow articles of plastic material the combination of a yielding table-top, a core, a slatted plate secured thereto, and means for winding said plate upon said core.

4. In an apparatus for the manufacture of hollow articles of plastic material, the combination with a yielding table-top, a core, the core-heads secured thereto, a slatted plate secured to said core, and means for winding said plate upon said core, substantially as described.

In witness whereof I have hereunto set my hand in presence of two witnesses.

ROBERT KIESERLING.

Witnesses:
PAUL FISCHER,
F. FRITSCH.